United States Patent Office 3,459,581
Patented Aug. 5, 1969

3,459,581
PROCESS OF PRODUCING PRESSURE-SENSITIVE HECTOGRAPH TRANSFER SHEETS
Douglas A. Newman, Glen Cove, N.Y., assignor to Columbia Ribbon and Carbon Manufacturing Co., Inc., Glen Cove, N.Y., a corporation of New York
No Drawing. Filed Oct. 10, 1966, Ser. No. 585,263
Int. Cl. B41c *1/06;* B41m *5/00*
U.S. Cl. 117—36.1                                                4 Claims

ABSTRACT OF THE DISCLOSURE

Process for producing pressure-sensitive transfer sheets, for applying images to master sheets capable of being duplicated by heat without volatile solvent, which comprises uniformly distributing undissolved dyestuff and undissolved particulate dye solvent in resinous binder in transfer layer.

---

The present invention relates to novel hectograph transfer sheets for the production of imaged master sheets capable of forming copies under the influence of heat and pressure in the absence of spirit solvents, to the process of producing such transfer sheets and to the dry process of producing hectograph copies therefrom.

Several dry hectograph processes have been proposed in an effort to avoid the necessity of employing volatile solvents for the production of hectograph copies. My United States Patents Nos. 3,088,028 and 3,195,455 are illustrative of dry processes which employ heat in combination with heat-meltable coatings of solid dye solvent as a means for producing hectograph copies. While these processes are satisfactory for certain uses, such as in the pattern-making field where the copy need only be sufficiently clear to provide a cutting guide, the sharpness and clarity of the copies is sometimes below the standard required for office copy work. Also the necessity of using specially coated copy papers is a disadvantage, both economically and practically.

It is the primary object of the present invention to provide a dry hectograph copying process which enables the production of sharp, clear copies, suitable for use in the office copy field, on conventional untreated hectograph copy paper.

It is another object of this invention to provide hectograph transfer sheets containing heat-activatable particulate dye solvents capable of dissolving the solid dyestuff associated therewith.

These and other objects and advantages of the present invention will be clear to those skilled in the art in the light of the present disclosure.

According to the present invention, it has been discovered that the required quality and quantity of hectograph copies can be produced by means of a dry process provided that the dyestuff or other hectograph coloring matter is maintained in solid undissolved condition until it is transferred to the master sheet and subjected to heat and contact pressure in the duplicating process.

Since the amount of heat used in the duplicating process must be relatively low, in the order of from about 90° F. up to about 200° F., the dye solvents must be meltable generally at or below the melting point of conventional waxes. Therefore the present transfer sheets cannot be based upon wax binder materials or be prepared according to the hot melt process.

The present hectograph transfer coatings are based upon synthetic thermoplastic resinous binder materials such as cellulose ethers, vinyl resins, acrylic resins, and the like, and are applied by means of volatile organic solvent which must not dissolve either the hectograph colorant or the solid dye solvent.

The dye solvents useful according to this invention are hard, brittle solids capable of being reduced to fine particulate or crystalline form and having melting points within the range of from about 90° F. to about 200° F. so as to retain their particulate form at temperatures below about 90° F. Suitable materials include organic salts such as triphenyl phosphate, soaps such as calcium stearate, metallic resinates such as sodium resinate, hard waxes such as Opalwax and Carbowax 4000, and a variety of other hard materials capable of being reduced to fine particulate or crystalline form and having the ability, when melted, to dissolve hectograph dyestuffs or complementary color-forming chemicals. The soft or semisolid dye solvents such as stearic acid, cetyl alcohol, Carbowax 1000 and the like are unsuitable in that they are not capable of being pulverized and have the disadvantage that, as soft materials, they tend to dissolve the dyestuff to some extent at room temperatures. Materials capable of retaining particulate form at temperatures below about 90° F. are sufficiently solid to be complete non-solvents in the absence of heat and have the added advantages that they can be uniformly distributed throughout the hectograph composition in the same manner as a filler and function in the same manner as a filler in the transfer layer so as to impart additional frangibility or pressure-transferability to the transfer layer.

Solvent hectograph transfer compositions are known and such known compositions may be used by modifying them according to the present invention by including therein the solid particulate dye solvent. The dye solvent is generally used in amounts ranging from about 20% up to about 60% by weight of the total hectograph composition and preferably is present in an amount equal to or exceeding the amount of the hectograph colorant. Suitable hectograph compositions are as illustrated by United States Patents Nos. 2,872,340 and 3,177,086, among others. The preferred compositions are those based upon cellulosic binder materials and containing oils as taught by the latter patent, the oils selected being substantial nonsolvents for both the hectograph colorant and the particulate dye solvent.

The preferred colorants are the conventional undissolved hectograph dyestuffs such as the triphenyl methanes. However, the conventional substantially-colorless color-forming reactants may be used, if desired. Thus reactive chemicals such as gallic acid and ferric chloride or dye components such as the carbinols or the azo dye bases may be included in the hectograph composition in solid unreactive association with chemical compounds which are normally reactive therewith in a liquid medium, or one or more of the reactive chemicals may be present in a coating on the copy sheet. When either one or both of the reactive components are dissolved by the heated dye solvent, a reaction follows and the intensely-colored reaction product is either formed on or transfers to the surfaces of a succession of copy sheets pressed thereagainst during heating. The following United States Patents illustrate conventional color-forming systems suitable for use according to the present invention: Nos. 2,872,863; 2,873,671; 2,927,041; and 2,935,938, among others.

The hectograph colorant is generally present in an amount ranging from about 10% up to about 50% by weight of the total hectograph composition.

The volatile organic solvent used to apply the hectograph composition to its foundation is one which does not dissolve either the hectograph colorant or the solid dye solvent. If either of these materials is reduced to dissolved condition during the coating operation, then the objectives of the invention are frustrated. Firstly, the frangibility of the hectograph layer is destroyed or at least impaired since the particulate form of both the colorant and dye solvent is responsible for disrupting the continuity of the resinous transfer layer and lending frangibility thereto. Secondly, the continuous production of a succession of imaged copy sheets from the master images required that the master images contain undissolved dye or color-forming particles. In such full concentration these colorants are capable of gradually generating an abundance of color under the effects of heat.

The following example is given by way of illustration and should not be considered limitative:

Example

The following ingredients are mixed to a uniform coatable consistency, preferably by first dissolving the cellulosic binder in an amount of the volatile solvent and dissolving the oils in the remainder of the volatile solvent and dispersing the dyestuff and dye solvent in either or both of these solutions, and finally mixing the solutions.

| Ingredients: | Parts by weight |
|---|---|
| Ethyl cellulose | 5 |
| Refined rapeseed oil | 10 |
| Mineral oil | 3 |
| Black iron oxide | 3 |
| Crystal violet dyestuff | 10 |
| Triphenyl phosphate | 14 |
| Tuluol | 55 |
| | 100 |

The composition is applied to a flexible foundation such as paper or plastic film and the toluol is evaporated to form the solidified transfer layer and the final hectograph transfer sheet.

This transfer sheet is then used to image a hectograph master sheet in conventional manner such as by typing. The master is then used to produce a great number of hectograph copies by placing the imaged surface of the master sheet in contact with the surface of a conventional hectograph copy sheet, the master images being heated to a temperature sufficiently high to melt the triphenyl phosphate, and stripping the copy sheet from the master whereby images are formed on the copy sheet surface in areas corresponding exactly to the location of the images on the master sheet. This process is repeated with fresh copy sheets to produce as many copies as necessary.

The heating of the master images preferably takes place while the master sheet and copy sheets are in contact although it is possible to first heat the master and bring it into contact with each copy sheet while the dye solvent is still in melted condition. The only pressure necessary is that amount required to maintain the master sheet and copy sheet in intimate surface contact.

According to the preferred method, the master and copy sheet are inserted into a conventional infrared radiation-exposure machine such as a Thermo-Fax machine. As the sheets are compressed they are exposed to infrared radiation which is absorbed by the master images due to the presence therein of black iron oxide or a small amount of any other infrared radiation-absorbing pigment or dyestuff. The absorbed radiation heats the master image sufficiently to melt the dye solvent and dissolve at least a portion of the dyestuff during each exposure. The dissolved dyestuff at the surface of the master images stains the surface of the copy sheet pressed thereagainst to form sharp, clear duplicate images which have immediate color intensity and which are clean to the touch and resist spreading due to the fact that the dyestuff therein is in dissolved condition.

It is also possible to use direct heat rather than infrared radiation to effect the heating step. Thus conventional heating devices such as a heated platen, a Xerox oven or the like may be used to heat the master images to the required temperature of from 90° F. to 200° F.

According to a preferred embodiment of this invention, the hectograph transfer layer is provided with a supercoating of the type conventionally used in the art for purposes of shielding the hectograph layer from contact with the hands and improving the transfer properties of the hectograph layer. Such supercoatings are generally based upon soft waxes such as beeswax and microcrystalline wax containing small amounts of resinous additives such as polybutene resin to increase the adhesion of the supercoating for the master sheet. These supercoatings are applied at temperatures sufficiently low as not to cause melting of the dye solvent in the hectograph layer. Even if the supercoating composition has a temperature above the melting point of the dye solvent, melting of the dye solvent is avoided by quickly chilling the applied supercoating.

The supercoating composition may also be a volatile solvent-applied composition based upon a resinous binder such as chlorinated rubber, polyethylene or cellulose plastic applied at room temperature, the solvent being of necessity a non-solvent for the colorant and dye solvent. United States Patents Nos. 2,671,734 and 2,729,575 are illustrative of suitable supercoating compositions and processes.

Variations and modifications may be made within the scope of the claims and portions of the improvements may be used without others.

I claim:
1. The process of producing a pressure-sensitive transfer sheet for the imaging of master sheets capable of being duplicated by means of heat and in the absence of volatile solvent which comprises coating a flexible foundation sheet with a composition comprising resinous binder material having uniformly dispersed therein from about 10% to about 50% by weight of a solid undissolved hectograph imaging material and from about 20% to about 60% by weight of a hard, brittle, solid particulate material which is meltable at a temperature within the range of about 90° F. to about 200° F. and which, in its melted state, is a solvent for said imaging material, and a volatile solvent for said binder material which is a substantial non-solvent for said imaging material and said particulate material, and evaporating said volatile solvent to form solid pressure-transferable layer on said foundation sheet having improved frangibility due to the hectograph imaging material and the particulate material being uniformly dispersed therein as separate discrete solids.

2. The process according to claim 1 in which the solid particulate material is a hard solid which has been pulverized to particulate form.

3. The process according to claim 1 in which the solid particulate material is crystalline and is present in the form of discrete crystals.

4. The process according to claim 1 in which the composition also comprises an oily modifying agent for the binder material which is a substantial non-solvent for said imaging material and for said particulate material.

References Cited

UNITED STATES PATENTS 3,230,875 1/1966 Newman _____ 101—149.4
3,252,413 5/1966 Sharkey _____ 101—147.4

DAVID KLEIN, Primary Examiner

U.S. Cl. X.R.

101—469, 470, 473; 117—36